United States Patent
Uebayashi et al.

[11] Patent Number: 6,157,628
[45] Date of Patent: Dec. 5, 2000

[54] RETRANSMISSION CONTROL METHOD OF CDMA MOBILE COMMUNICATION

[75] Inventors: Shinji Uebayashi, Yokohama; Hui Zhao, Kanagawa, both of Japan

[73] Assignee: NTT Mobile Communications Network, Inc., Japan

[21] Appl. No.: 08/793,642

[22] PCT Filed: Oct. 22, 1996

[86] PCT No.: PCT/JP96/03059

§ 371 Date: Nov. 14, 1997

§ 102(e) Date: Nov. 14, 1997

[87] PCT Pub. No.: WO97/16044

PCT Pub. Date: May 1, 1997

[30] Foreign Application Priority Data

Oct. 24, 1995 [JP] Japan ................................ 7-275958

[51] Int. Cl.[7] .................................................. H04B 7/216
[52] U.S. Cl. ......................................... 370/335; 370/329
[58] Field of Search ................................... 370/346, 348,
370/349, 342, 311, 441, 442, 320, 324,
335, 336, 337, 345, 347, 479; 371/33; 455/38.1,
422

[56] References Cited

U.S. PATENT DOCUMENTS

| | | | |
|---|---|---|---|
| 4,149,142 | 4/1979 | Kageyama et al. | |
| 5,027,356 | 6/1991 | Nakamura et al. | |
| 5,297,144 | 3/1994 | Gilbert | 370/346 |
| 5,533,012 | 7/1996 | Fukasawa | 370/342 |
| 5,537,414 | 7/1996 | Takiyasu | 370/347 |
| 5,586,113 | 12/1996 | Adachi | 370/342 |
| 5,623,484 | 4/1997 | Muszynski | 370/335 |
| 5,625,627 | 4/1997 | Ishi | 370/347 |
| 5,701,298 | 12/1997 | Diachina | 370/346 |
| 5,734,646 | 3/1998 | I | 370/335 |
| 5,896,374 | 4/1999 | Okumura | 370/311 |

FOREIGN PATENT DOCUMENTS

| | | |
|---|---|---|
| 0 595 637 | 5/1994 | European Pat. Off. |
| 0 633 671 | 1/1995 | European Pat. Off. |
| 64-36234 | 2/1989 | Japan . |
| 4-10720 | 1/1992 | Japan . |
| 5-91009 | 4/1993 | Japan . |
| 5-145527 | 6/1993 | Japan . |

OTHER PUBLICATIONS

Esmailadeh R et al. "Quasi–Synchronous Time Division Duplex CDMA", IEICE Transactions on Fundamentals of Electronics, Communications and Computer Sciences, vol. E78–A, No. 9, Sep. 1, 1995, pp. 1201–1205, XP000544198.

*Primary Examiner*—Douglas W. Olms
*Assistant Examiner*—Ricardo M. Pizarro
*Attorney, Agent, or Firm*—Brinks Hofer Gilson & Lione

[57] ABSTRACT

In CDMA mobile communication of the packet switching mode which is one-way, the packet is transmitted to divide to a frame unit. In this time, the first, the second and the third transmission timing which are obtained to divide to three pieces the predetermined frame are set up for increasing the transmission efficiency by realizing the retransmission of the frame unit, as the transmission timing of a backward control signal in a backward channel,. Base station 100 transmits a forward signal (a forward control signal and an user data signal) by using code A (a forward channel) at any frame. When the forward signal is received at this frame by mobile station 70, mobile station 70 transmits a receiving acknowledgment signal (a backward control signal) of the forward signal by using code A' at the first transmission timing of the next frame. Conversely, when the forward signal is not received correctly, mobile station 70 transmits a retransmission request signal (the backward control signal) of the forward signal by using code A' at the first transmission timing of the next frame. The similar operation carries out in mobile stations 80 and 90. However, in this case, the transmission timing of the backward channel is the second or the third timing.

11 Claims, 9 Drawing Sheets

RETRANSMISSION CONTROL METHOD OF CDMA MOBILE COMMUNICATION

TECHNICAL FIELD

The present invention relates to a retransmission control method and to a mobiles communication system employing the method, for use in the case where data communications are carried out between a base station and a plurality of mobile stations and the mobile communication employs CDMA (Code Division Multiple Access).

BACKGROUND ART

In mobile communications, in the case of data communication in which retransmission control is carried out, it has been the conventional practice to adopt full duplex communication for a circuit switching mode which employs equal capacity channels which operate in opposite directions. FIG. 7 is a block diagram showing a structural example of a conventional mobile data communication system. This figure will now be used to explain the method by which terminal 11 of mobile station 10 transmits data to terminal 61 which is connected to a public telephone network. However, since terminal 11 and terminal 61 may be connected using a well-known procedure such as one determined according to RCR STD-27C, the digital automobile telephone system standard in Japan, for example, the following explanation will address a data transmission method where a fill duplex line is already established between terminal 11 and terminal 16.

First, terminal 11 of mobile station 10 supplies data (user data) to be transmitted to data communication unit 12. Data communication unit 12 forms a data frame which is used with radio transmission by adding an error detecting code and an error correction code to the user data which is supplied from terminal 11. Data communication unit 12 supplies a signal of the data frame to transmission and transmitter-receiver 13, and simultaneously records the user data for the retransmission. Transmission and transmitter-receiver 13 modulates the signal supplied from data communication unit 12, and transmits the modulated signal to base station 40. Transmission and transmitter-receiver 41 of base station 40 receives the modulated signal, demodulates the received signal, and then supplies the demodulated signal to control station of base station 50. Switching apparatus 51 of control station 50 relays a signal which is supplied from transmission and transmitter-receiver 41 to data communication unit 52.

Data communication unit 52 demodulates the user data, the error correction code and the error detecting code in the relayed signal (signal of aforementioned data frame). When data communication unit 52 is able to determine that there is no error in the user data, data communication unit 52 transforms the demodulated user data to a signal format for the public telephone network, and outputs the transformed data to terminal 61 through the public telephone network. On the other hand, when data communication unit 52 determines that the user data has an error, data communication unit 52 carries out retransmission between itself and data communication 12 of mobile station 10. In this way, then, retransmission control is carried out between data communication unit 12 of mobile station 10 and data communication unit 52 of control station 50.

Next, an explanation will be made of a conventional retransmission control method, FIG. 8 is a conceptual diagram showing the frame constitution of data (signal) which is transmitted and received between data communication unit 12 and data communication unit 52. An explanation will now be made of the operation of data communication unit 12 with reference to FIG. 8.

Data communication unit 12 first adds a forward control signal and a backward control signal to the user data upon receiving the user data from terminal 11. The forward control signal is a signal used in retransmission control which is carried out when data communication unit 52 of control station 50 does not correctly receive transmitted data from data communication unit 12. In general, the forward control signal consists of a frame number for the transmitted data and a retransmission signal recognition bit. The backward control signal is a signal for reporting to data communication unit 12 whether or not data communication unit 52 of control station 50 was able to receive the transmitted data correctly. In general, the backward control signal consists of a frame number for the received data or the data which failed to be received, and the receiving (ACK)/non-receiving (NAK) recognition bit.

Next, data communication unit 12 adds an error detecting code to the data unit, the data unit consisting of the user data signal, the forward control signal and the backward control signal. In other words, the data unit is encoded with an error detecting code. Data communication unit 12 forms a frame by encoding the data unit, which was encoded with an error detecting code, with an error correction code, and supplies the signal of the frame to transmission and transmitter-receiver 13.

FIG. 9 is a timing chart showing an example of the exchange of a transmission signal when data is transmitted and received using the frame construction. In FIG. 9, the transmitted frames from data communication unit 12 are sequentially designated frame A1, frame A2, . . . , while the transmitted frames from data communication unit 52 are sequentially designated frame B1, frame B2, . . . The signals to be transmitted in order from data communication unit 12 are designated forward signal a1, forward signal a2, . . . , and the signals to be transmitted sequentially at each frame from data communication unit 52 are designated forward signal b1, b2, . . . Each forward signal contains the user data signal and the forward control signal, and is transmitted after the backward control signal has been added thereto.

In FIG. 9, data communication unit 12 of mobile station 10 first transmits forward signal a1 at frame A1, next transmits forward signal a2 at frame A2, and then transmits; forward signal a3 at frame A3. Data communication unit 12 also receives forward signal b1 and backward control signal ACKa1 which are transmitted at frame B1 from data communication unit 52 of control station 50 in time with the transmission at frame A3, and confirms the details of the received signal. Herein, received backward control signal ACKa1 is the receiving acknowledgment signal of signal a1, and indicates that forward signal a1 was received correctly by data communication unit 52. When data communication unit 12 correctly receives forward signal b1, data communication unit 12 adds a receiving acknowledgment signal (backward control signal ANKb1) for forward signal b1 to forward signal a4 at frame A4, and transmits this signal. At this time, data communication unit 12 receives forward signal b2 and the backward control signal which were transmitted at frame. B2 from data communication unit 52 of control station 50.

Backward control signal NAKa2 is a retransmission request signal for forward signal a2, and indicates that forward signal a2 was not received correctly. Therefore, in the next transmission timing (frame A5), forward signal a2 is transmitted again. However, forward signal b2 was received correctly, so that backward control signal ACKb2, which is the receiving acknowledgment signal of forward signal b2, is added to forward signal a2 of the retransmission procedure.

The above-mentioned operation is carried out in the same way simultaneously in data communication unit 52 of control station 50, with two-way data communication carried out using the same channel (line).

As described above, it has been the conventional practice to adopt a full duplex communication for the circuit switching mode in the case of data communications employing a retransmission control method in mobile communications, with the backward control signal for controlling retransmission transmitted on the same channel as the forward signal (forward control signal and user data signal). However, it is generally rare that the traffic in data communications occurs at the same time in two directions. Rather, one-way data transmission is more frequent. Therefore, in the conventional method, a dummy signal is frequently transmitted in one direction of the full duplex line, giving rise to the problem that the utilization efficiency of the radio line is low.

As a method for resolving this problem, adoption of one-way communication in the packet switching mode may be considered. One popular method of one-way communication in the packet switching mode is a retransmission control method which, carries out retransmission of every packet or every message in the upper layer. However, this method has disadvantages in that the retransmission unit is large, and the transmission efficiency of the radio line is low. For example, a wireless LAN (Local Area Network) is able to realize packet data communication in the interval for radio, but adopts a retransmission control method for packet units. As a result, this method is applied under conditions of low transmission efficiency (see, for example, K. Pahlavan, "Trends in Local Wireless Data Networks", IEEE Vehicular Technology Conference 1996).

DISCLOSURE OF INVENTION

The present invention was developed in consideration of the above circumstances, and has as its objective the provision of a retransmission control method and a mobile communication system, wherein, in the case of data communication in the packet switching mode in one direction only in CDMA mobile communications, retransmission of the frame unit which divides packets is realized and the transmission efficiency is high.

(1) A retransmission control method of CDMA mobile communication which carries out the transmission of the user data by CDMA method between a base station and a plurality of mobile stations, wherein
  a transmission side of said user data transmits a signal which contains said user data at a predetermined time unit by using a forward channel,
  a receiving side of said user data judges whether there is a signal which is received correctly or not, on the basis of a receiving condition of a signal which passes through said forward channel, and sends back a backward control signal which requests the retransmission of a signal, which is not received correctly, by using a backward channel, if there is a signal which is not received correctly,
  said transmission side of said user data retransmits a signal of said predetermined time according as a contents of said backward control signal which is sent back through said backward channel, and
  an unique spread code is assigned to each channel respectively.

(2) A base station apparatus of CDMA mobile communication which carries out the transmission of an user data by CDMA method between a plurality of mobile stations, wherein
  when said base station apparatus transmits said user data, said base station apparatus transmits a signal containing said user data at a predetermined time unit by using a forward channel, and retransmits a signal of said predetermined time which is requested by a backward control signal which is sent back through a backward channel,
  when said base station apparatus receives said user data, said base station apparatus judges whether there is a signal which is received correctly or not, on the basis of a receiving condition of a signal which passes through said forward channel, and sends back a backward control signal which requests the retransmission of a signal, which is not received correctly, by using a backward channel, if there is a signal which is not received correctly, and
  an unique spread code is assigned to each channel respectively.

(3) A mobile station apparatus of CDMA mobile communication which carries out the transmission of an user data by CDMA method between a base station, wherein
  when said mobile station apparatus transmits said user data, said mobile station apparatus transmits a signal containing said user data at a predetermined time unit by using a forward channel, and retransmits a signal of said predetermined time which is requested by a backward control signal which is sent back through a backward channel,
  when said mobile station apparatus receives said user data, said mobile station apparatus judges whether there is a signal which is received correctly or not, on the basis of a receiving condition of a signal which passes through said forward channel, and sends back a backward control signal which requests the retransmission of a signal, which is not received correctly, by using a backward channel, if there is a signal which is not received correctly, and
  an unique spread code is assigned to each channel respectively.

In the above-mentioned (1)–(3), in the case where data communication in the packet switching mode is carried out in one direction only in CDMA mobile communications, retransmission at time units (a frame unit) which subdivide a packet is realized, while retransmission control having high transmission efficiency can be carried out.

Furthermore, if a time division technique is employed so that the backward control signal for each mobile station does not overlap, then all the mobile stations can use one backward channel in common, making effective channel use possible.

Furthermore, even in the case where a plurality of the backward channels are used, it is possible to decrease the probability of interference occurring by controlling so that the transmission timing and the receiving timing of the backward control signal in each backward channel do not become concentrated. The transmission timing and the receiving timing may be set for each backward channel or for each mobile station. Additionally, it is possible to set the transmission timing and the receiving timing in advance for each mobile station. In this case, the timing control of the retransmission becomes easy.

Furthermore, the base station may set the transmission timing and the receiving timing of the backward control signal in the backward channel. In this case, it is possible to realize optimal timing control, without deviation. This effect increases by carry out schedule management of the backward control signals to be transmitted.

Furthermore, it is possible to decrease the transmission power by designating the spread code of the backward channel to be a code having a higher processing gain than the spread code of the forward channel, although the transmission time in the backward channel then becomes longer. Moreover, it is possible to reduce to a low level the likelihood that traffic concentrates by lengthening the transmission time and evening out the traffic, even without strictly setting the transmission timing and the receiving timing of the backward control signal in the backward channel.

BEST MODE FOR CARRYING OUT THE INVENTION

The best mode for carrying out the present invention will now be described with reference to the drawings.

Figure 1:
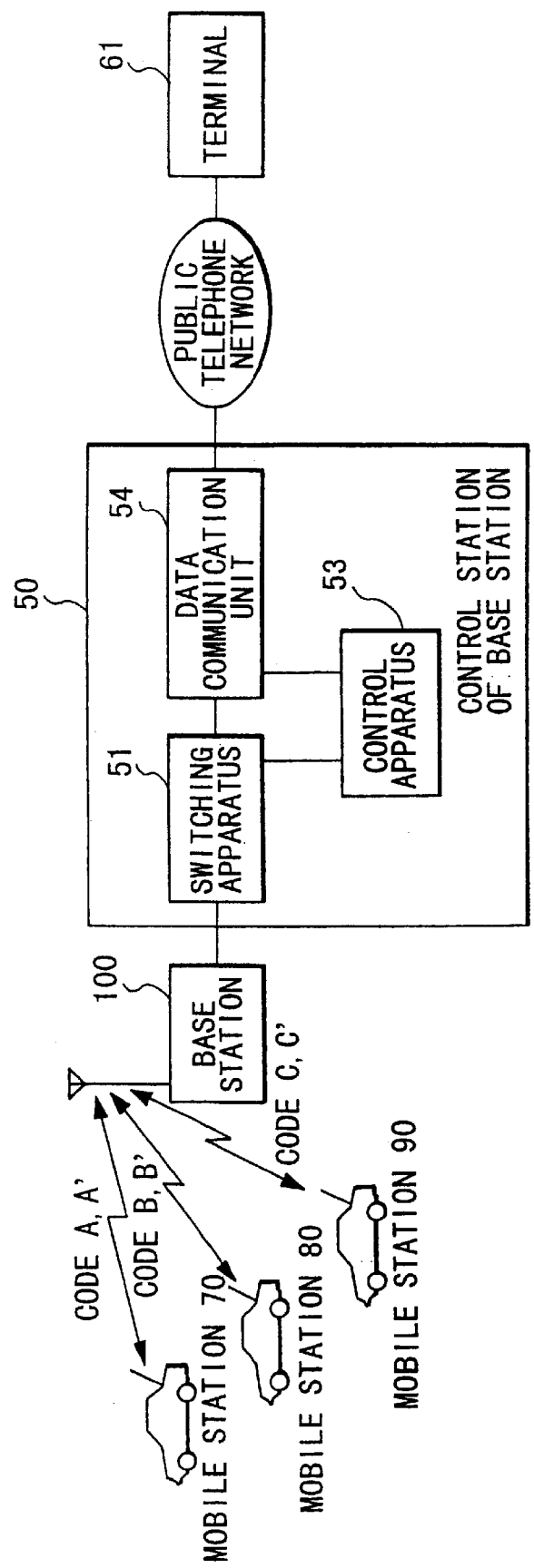
FIG. 1 is a block diagram showing the structure of a mobile communication system of a preferred embodiment in this invention.
Figure 7:
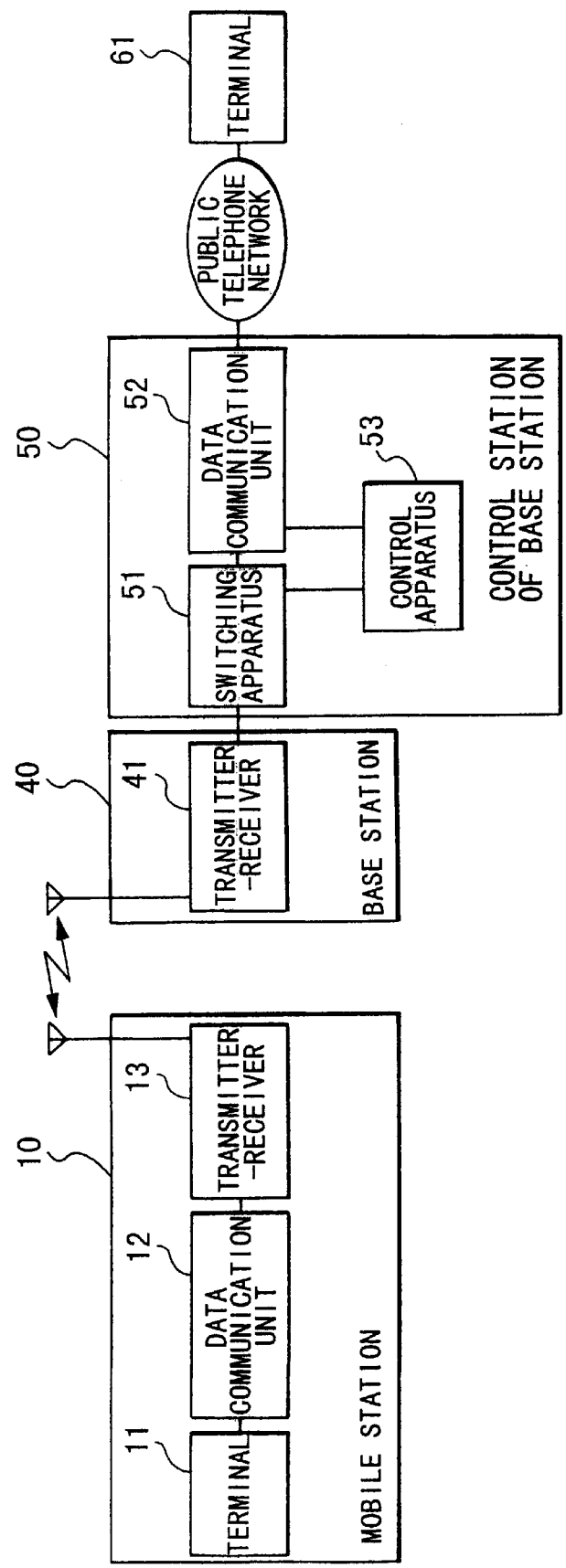
FIG. 7 is a block diagram showing a structural example of a conventional mobile data communication system.
Figure 8:
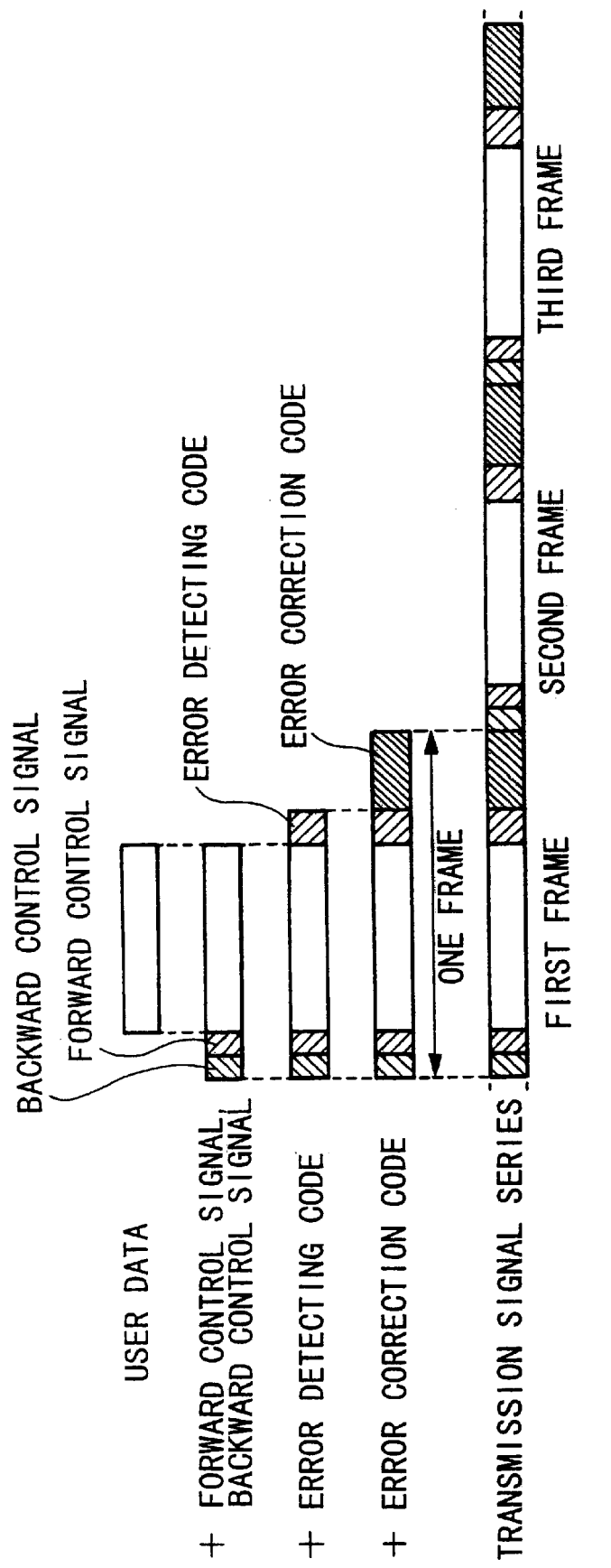
FIG. 8 is a conceptual diagram showing the frame constitution of data (signal) which is transmitted between data communication units in the conventional mobile communication system.
Figure 9:
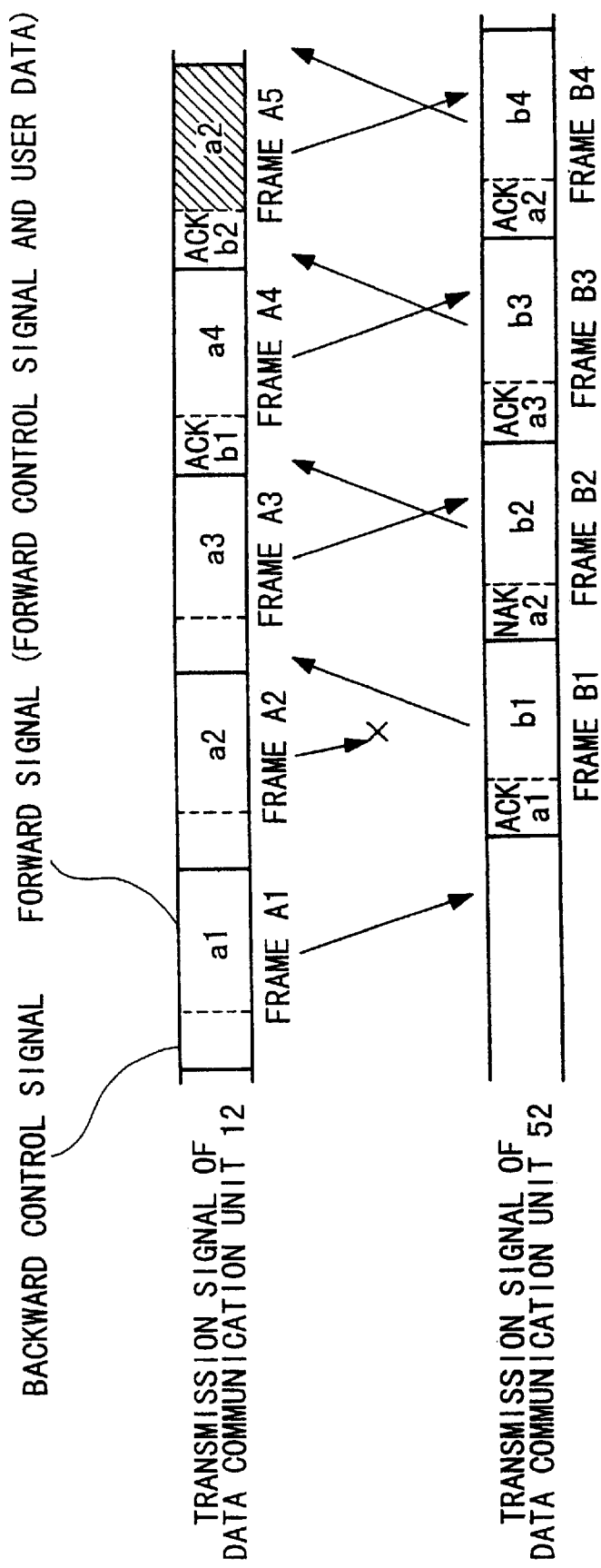
FIG. 9 is a timing chart showing an example of a transmission signal which is exchanged between data communication units in the conventional mobile communication system.

FIG. 1 is a block diagram showing the structure of a mobile communication system in a preferred embodiment of this invention. In FIG. 1, the same numeric symbols have been applied to parts which are common with the device shown in FIG. 7, and a description thereof will be omitted. While mobile stations 70, 80 and 90, and base station 10, shown in FIG. 1, have the same internal constitution as mobile station 10 and base station 40 shown in FIG. 7, they differ significantly on the points that data transmission is carried out by the CDMA method, and that the channel for the data transmission is used by dividing it into a forward channel and a backward channel. Additionally, data communication unit 54 and the data communication units (not shown) in each mobile station differ from data communication unit 52 shown in FIG. 7 with regard to the retransmission control method.

An explanation will first be made of an example of a packet data communication which is carried out between each mobile station 70, 80 and 90, and base station 100 with reference to the system shown in FIG. 1. A CDMA method is adopted for the packet data communication between the base station and the mobile stations. Base station 100 transmits a signal to mobile stations 70, 80 and 90 using codes (spreading code) A, B and C. On the other hand, mobile stations 70, 80 and 90 transmit a signal to base station 100 using codes A', B' and C'. Herein, each channel corresponding to codes A, B and C is a forward channel, and each channel corresponding to codes A', B' and C' is a backward channel. Additionally, base station 100 determines each code is decided and notifies each mobile station, for example.

Figure 2:
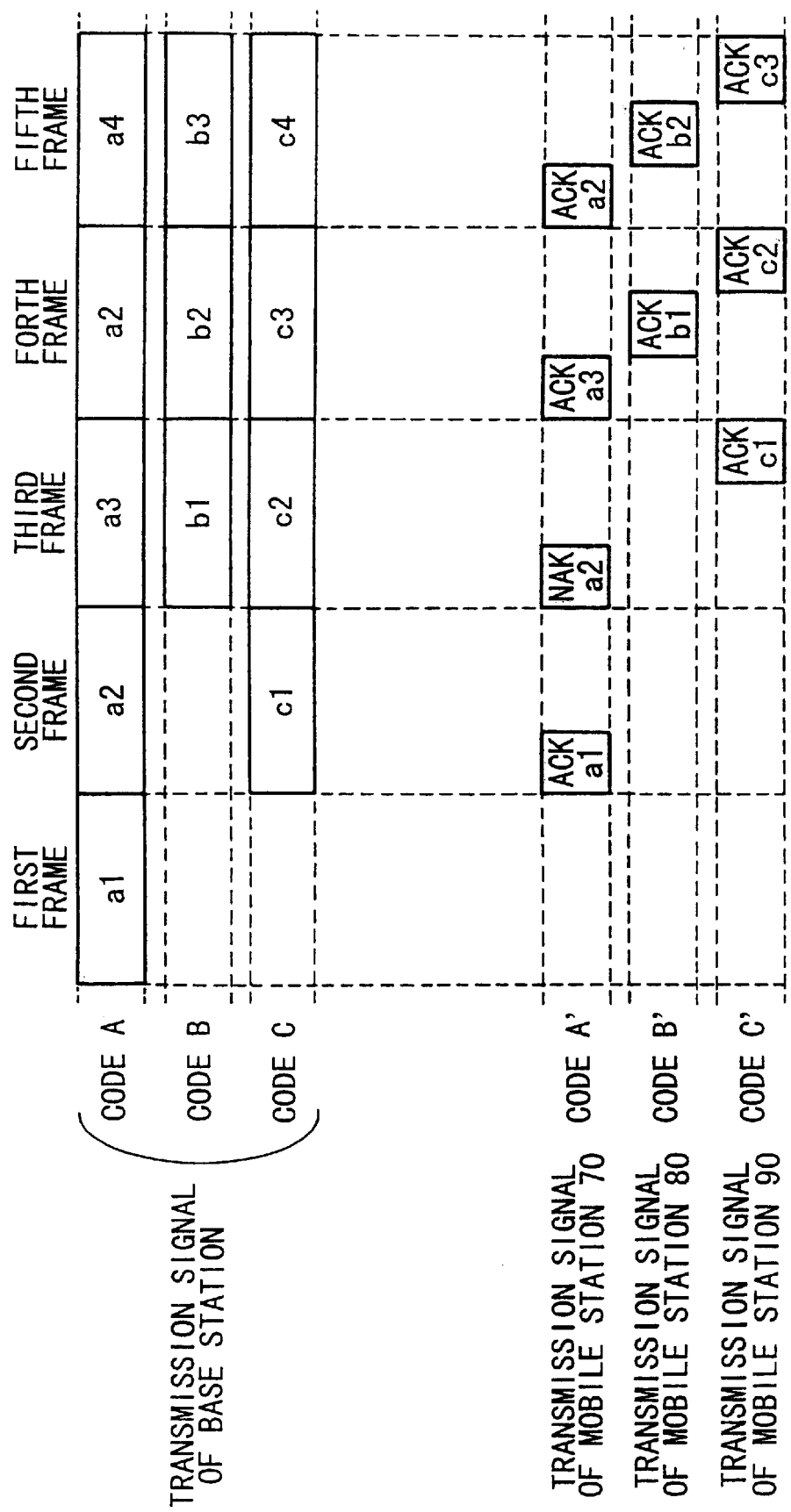
FIG. 2 is a timing chart showing an example of a transmission signal in the case of transmission data from a base station to a mobile station in the mobile communication system.

The transmission timing of a signal in the backward channel is assigned to a frame which is divided into three parts. An example of the assignment is shown in FIG. 2. In the example shown in FIG. 2, the first transmission timing corresponding to the frame head is assigned to mobile station 70, the second transmission timing corresponding to the frame center is assigned to mobile station 80, and the third transmission timing corresponding to the frame end is assigned to mobile station 90, in advance. An explanation will now be made of a data communication procedure where the above-described assignment has been carried out. Additionally, a single packet is normally transmitted by dividing into a plurality of frames.

An explanation will first be made of a case where base station 100 transmits data to each mobile station at the same time. First, base station 100 transmits to mobile station 70 the first forward signal (forward control signal and user data signal) a1 using code A at the first frame. When mobile station 70 receives forward signal a1 at the first frame, mobile station 70 transmits the receiving acknowledgment signal (backward control signal ACKa1) of forward signal a1 by using code A' at the first transmission timing in the second frame.

Base station 100 also transmits forward signal a2 by using code A at the second frame, and transmits newly occurring packets to mobile station 90 as forward signal c1 using code C. At this time, base station 100 receives backward control signal ACKa1 from mobile station 70, and recognizes that mobile station 70 correctly receives forward signal a1.

Additionally, this discussion assumes that an error occurs in a radio transmission line to forward signal a2, and transmission is not carried out correctly to mobile station 70. In this case, mobile station 70 cannot receive forward signal a2, so that mobile station 70 transmits the retransmission request signal (backward control signal NAKa2) using code A' at the first transmission timing of the third frame. On the other hand, mobile station 90 can receive forward signal c1, so that mobile station 90 transmits backward control signal ACKc1 using code C' at the third transmission timing of the third frame.

On the other hand, base station 100 transmits forward signal a3 using code A and forward signal c2 using code C at the third frame. Furthermore, base station 100 transmits newly occurring packets to mobile station 80 as forward signal b1 using code B. At this time, base station 100 receives backward signal NAKa2 which is transmitted from mobile station 70 and backward control signal ACKc1 which is transmitted from mobile station 90. As a result, base station 100 recognizes that forward signal a2 is not received correctly by mobile station 70 and forward signal c1 is received correctly by mobile station 90.

At the mobile station side, mobile station 70 receives forward signal a3 and transmits backward control signal ACKa3 using code A' at the first transmission timing of the forth frame. Mobile station 80 receives forward signal b1, and transmits backward control signal ACKb1 using code B' at the second transmission timing of the forth frame. Furthermore, mobile station 90 receives forward signal c2, and transmits backward control signal ACKc2 using code C' at the third transmission timing of the forth frame.

On the other hand, base station 100 receives backward control signal NAKa2 at the third frame, so that base station 100 retransmits forward signal a2 using code A at the forth frame. In the case where the retransmission succeeds, the signal which is transmitted to mobile station 70 at the forth frame becomes forward signal a4. In the forth frame, base station 100 transmits forward signal b2 using code B, and transmits forward signal c3 using code C.

Figure 3:
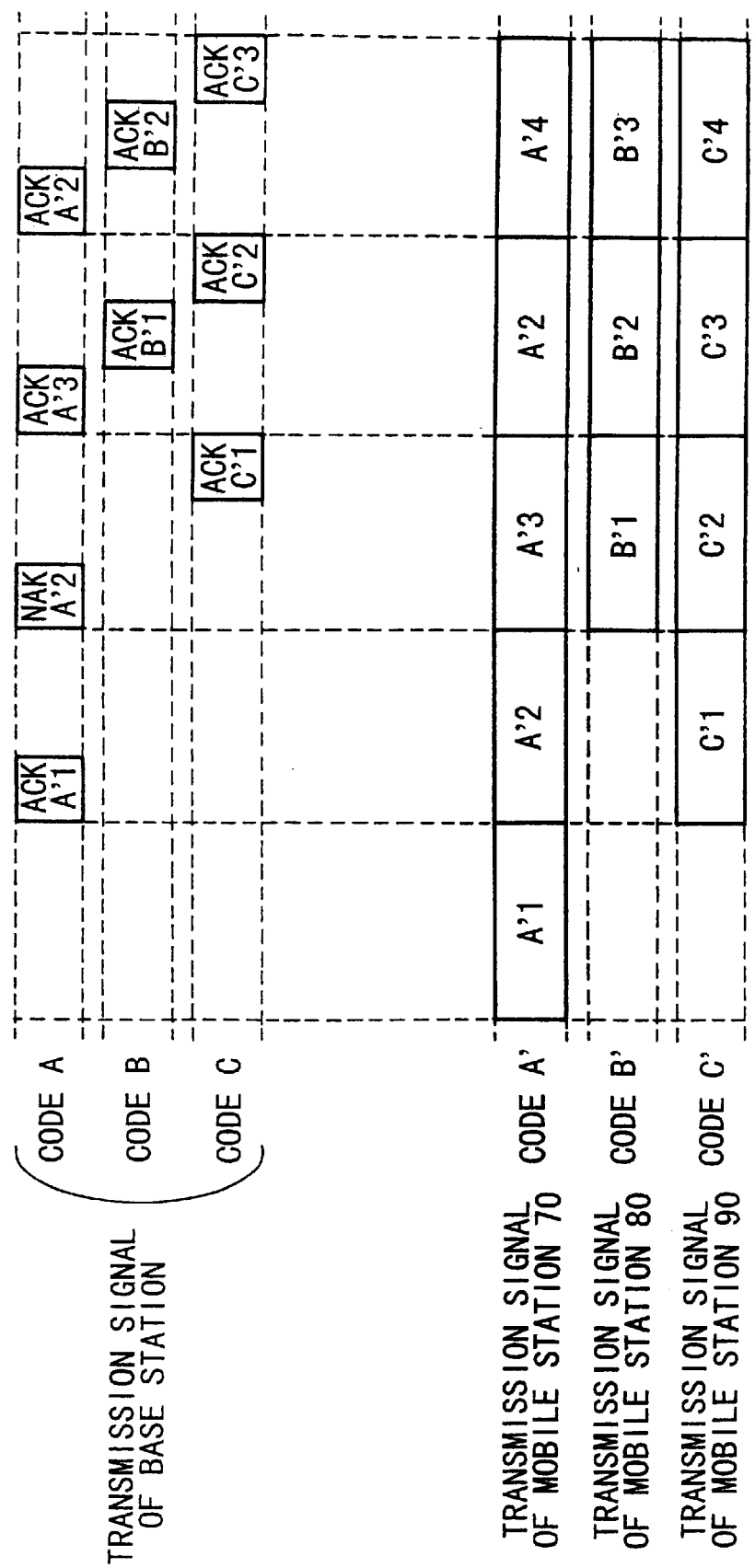
FIG. 3 is a timing chart showing an example of a transmission signal in the case of transmission data from a mobile station to a base station in the mobile communication system.

Next, FIG. 3 shows an example where each mobile station transmits data to base station 100 at the same time. In this example, the transmission timing of the backward control signal is assigned for each mobile station in the same manner as in the above example. In FIG. 2, the procedure is carried out by exchanging the transmission side and the receiving side. In other words, with the exception that the transmission and receiving sides are exchanged, the procedure in this case is the same way as above.

As described above, in this embodiment, packets are transmitted while retransmission is carried out at each frame.

In the example shown in FIG. 2, there is no user data transmitted from the mobile station side, so that each mobile station transmits only the backward control signal. However, if all mobile stations transmit the backward control signal with an equivalent timing, then the interference power increases remarkably, and the communication quality deteriorates. Therefore, in the examples shown in FIG. 2 and FIG. 3, the transmission timing of the backward control signal is divided into three sections. The first transmission timing is assigned to mobile station 70, the second transmission timing is assigned to mobile station 80, and the third transmission timing is assigned to mobile station 90. As a result, the transmission timing of the signal disperses, so that it is possible to decrease the interference power between the signals. Thus, it is possible to maintain high quality in the communication line.

However, the transmission timing of the backward control signal is not limited to three sections. For example, n transmission timings may be prepared, and then the transmission timing may be set by using the remainder which is obtained when a natural number particular to each mobile station (the station number, for example) is divided by n. If a certain amount of deviation in traffic is permitted, then it is possible to disperse the transmission timing by this method.

Furthermore, base station 100 may set the transmission timing of each mobile station, and it may notify each mobile station of the set transmission timing. In this case, although it is necessary to for base station 100 to notify each mobile station of the transmission timing, it is possible to carry out the optimal timing control without the traffic deviation.

Additionally, if the transmission of the backward control signal to be transmitted is scheduled in base station 100, it is possible to carry out the most suitable timing control. In practice, there are transmission delays in the radio intervals and signal process delays, but these delays can change according to the characteristics of the communication system, and are matters to be considered suitably according to the actual communication system.

However, when the forward control signal is not received correctly, it is not possible to easily determine which frame was not received. However, we will omit a description of the ARQ control algorithm at the receiving side, since it does not relate to this invention directly.

Incidentally, in general, the backward control signal consists of about ten bits, or of about from twenty bits to thirty bits when the error correction encoding etc., is considered. In contrast, the length of the user data in the forward signal is 300 bits or more, in general. Therefore, it is ordinarily possible to set the transmission timing of the backward control signal to 10 parts or more.

Furthermore, if the backward control signal is spread by using a code which has high processing gain, then it is possible to decrease the transmission power, although the transmission time becomes longer. Further, it is also possible to obtain the same effect if the processing gain is increased equivalently by repeatedly using the spread code. That is, if the transmission time in the backward channel becomes equal to the transmission time in the forward channel by sufficiently increasing the processing gain, then it is possible to even-out the traffic because continuous transmission is also carried out in the backward channel.

Figure 4:
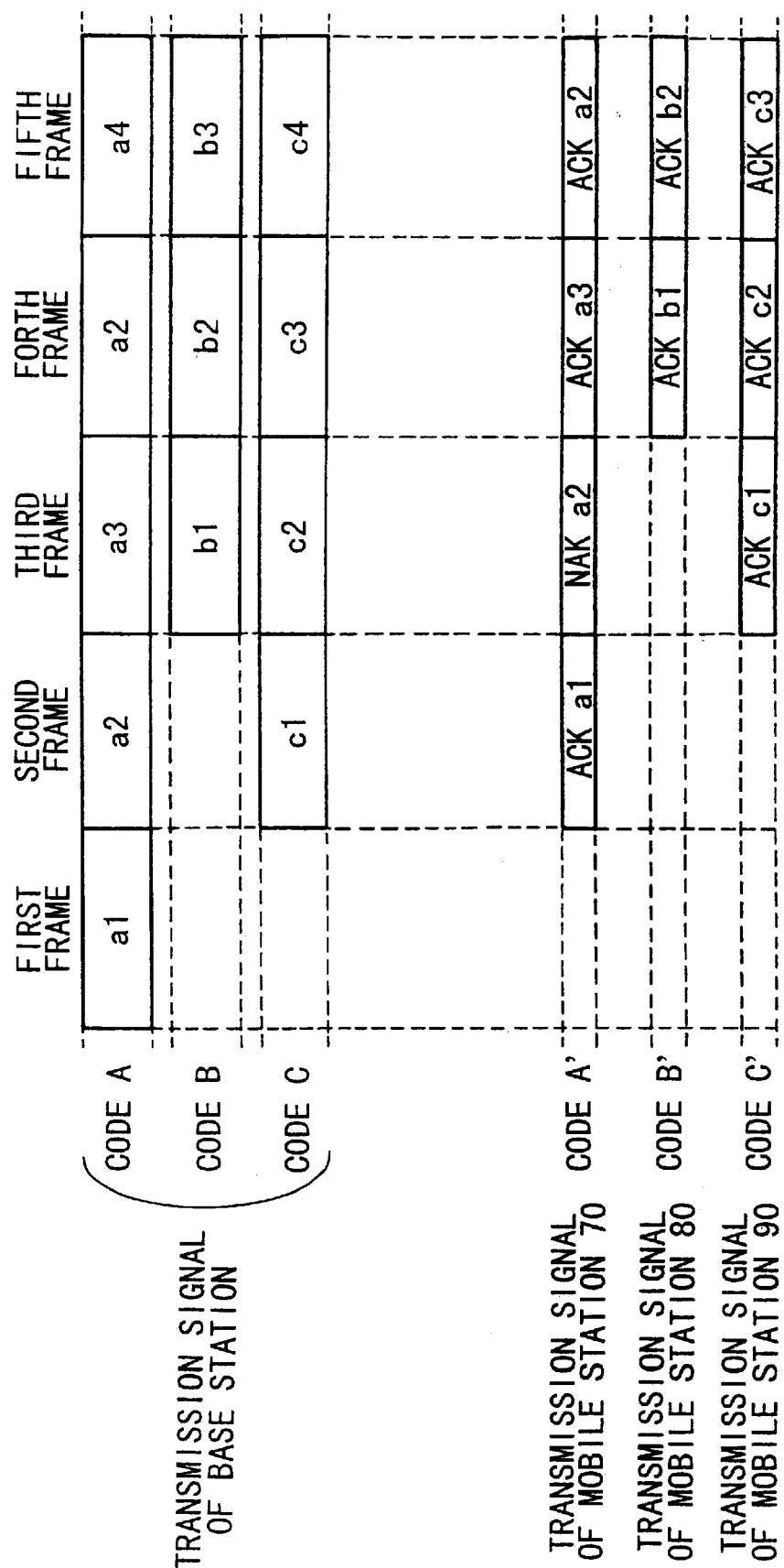
FIG. 4 is a timing chart showing another example of a transmission signal in the case of transmission data from a base station to a mobile station in the mobile communication system.

FIG. 4 is a timing chart showing an example of the state in which a signal. is transmitted and received between base station 100 and each mobile station 70, 80 and 90, when continuous transmission and low transmission power has been realized by increasing the processing gain of the backward control signal. FIG. 4 shows the case where base station 100 transmits data to each mobile station 70, 80 and 90. In this example, the transmission power is decreased by lengthening the transmission time to increase the processing gain of the backward channel. As is clear from this timing chart, the transmission bit rate of each backward control signal is slow, so that even if the backward control signals from each mobile station overlap, traffic does not concentrate to a degree which would cause interference. Furthermore, the transmission time of each backward control signal is long, so that a sudden change in the total amount of traffic does not readily occur. Thus, the probability of interference occurring is constrained to a low level.

Additionally, although the above example employed the case where the code of the backward channel was a number particular to the mobile station, in the case where the base station carries out the burst transmission to designate the transmission timing, it is possible through time division to share a backward channel used in common by a plurality of mobile stations. An example of the state wherein a signal is transmitted and received between base station 100 and each mobile station 70, 80 and 90, in the case where mobile stations 70, 80 and 90 use a common backward channel in this embodiment, is shown in FIG. 5 and FIG. 6.

Figure 5:
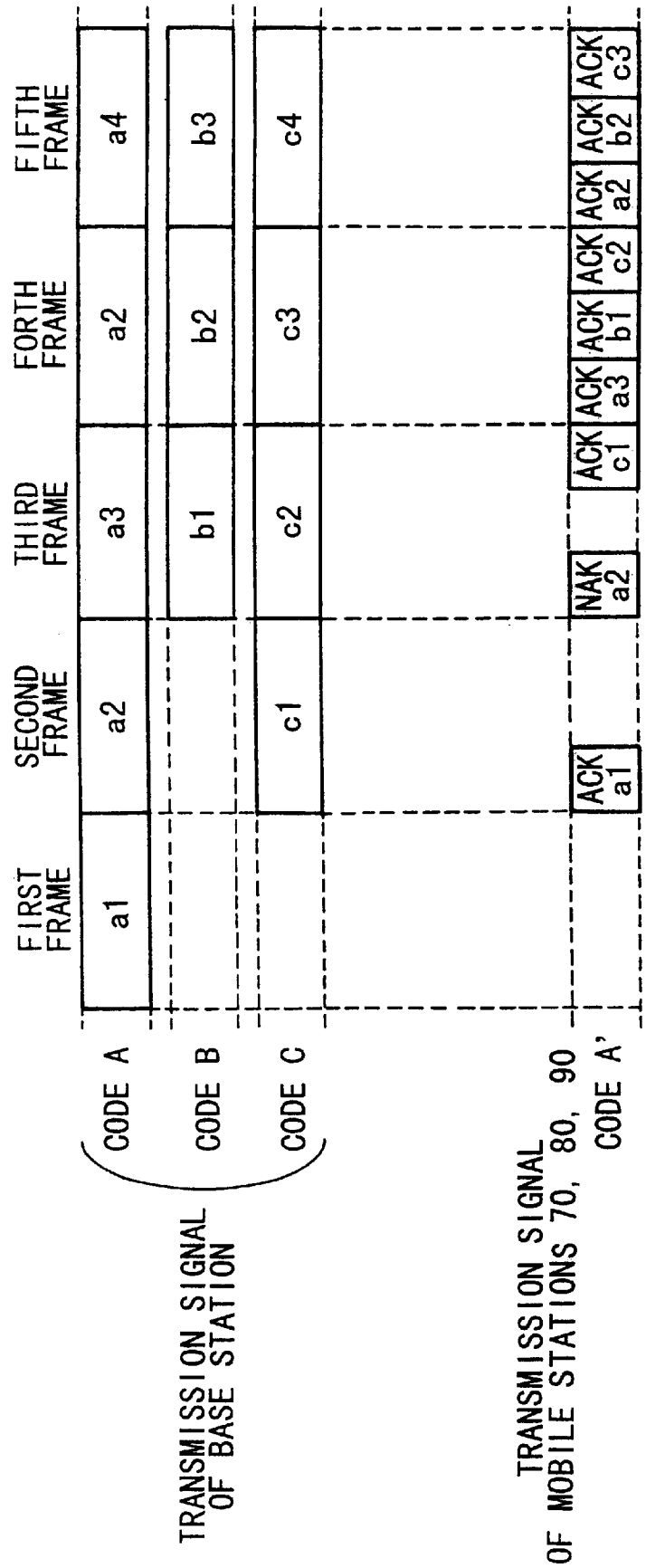
FIG. 5 is a timing chart showing another example of a transmission signal in the case of transmission data from a base station to a mobile station in the mobile communication system.
Figure 6:
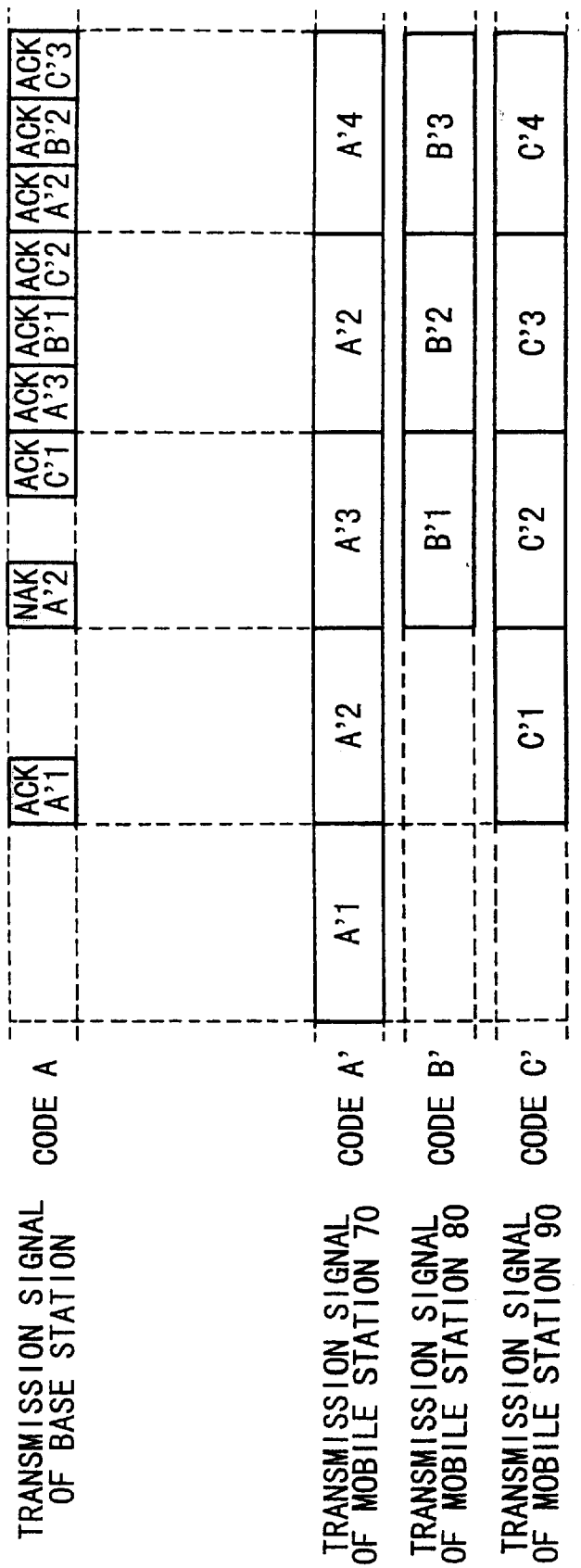
FIG. 6 is a timing chart showing another example of a transmission signal in the case of transmission data from a mobile station to a base station in the mobile communication system.

FIG. 5 is a timing chart for the case where data is transmitted from base station 100 to mobile stations 70, 80 and 90, and FIG. 6 is a timing chart for the case where data is transmitted from mobile stations 70, 80 and 90 to base station 100. The state of the data communication shown in these figures is the same as that shown in FIG. 2 and FIG.

3, so that a description thereof is omitted. However, the example shown in FIG. 5 differs from the example shown in FIG. 2 only in that mobile stations 80 and 90 use code A' to transmit the backward control signal, and do not use codes B' and C'.

The example shown in FIG. 5 and FIG. 6 is effective for the case where the number of codes (the number of channels) is not enough with respect to the number of mobile stations. Additionally, this example is also effective in enabling reduction in the scale of a demodulation circuit. For example, if only a single channel is designated as the backward channel for all of the mobile stations, then the demodulation circuit in base station 100 is acceptable provided it is able to demodulate a number of signals which is one greater than the forward channel number.

What is claimed is:

1. A retransmission control method for a CDMA mobile communication system in which a user data is unidirectionally transmitted in packets from a sending side to a receiving side between a base station and a plurality of mobile stations, said method comprising the steps of:
    (a) establishing a plurality of forward and backward channels in pairs each assigned for communication between said base station and one of said plurality of mobile stations and each assigned a different spread code;
    (b) dividing each of said packets into a plurality of frames at said sending side;
    (c) transmitting said frames from said sending side to said receiving side through said forward channels;
    (d) upon each receipt of one frame, transmitting from said receiving side to said sending side through said backward channels, a backward control signal that indicates whether or not said one frame has been received correctly at said receiving side, said backward control signals being transmitted at different transmission timings to avoid overlap of transmissions thereof on said backward channels; and
    (e) retransmitting, from said sending side to said receiving side through said forward channels, a frame that said backward control signal indicates has not been received correctly at said receiving side.

2. A retransmission control method as recited in claim 1, wherein said base station designates assignment of said transmission timings to said backward control signals to avoid overlap of transmissions thereof on said backward channels, and said base station sends said mobile stations information on the designated assignment of said transmission timings.

3. A retransmission control method as recited in claim 2, wherein said transmission timings are defined in series in a transmission time of one frame, and each of said mobile stations is assigned one transmission timing during the transmission time of each frame and sends or receives a backward control signal at the assigned transmission timing.

4. A retransmission control method as recited in claim 1, wherein each frame includes error detecting codes attached thereto at said sending side, and it is determined at the received side based on said error detecting codes whether or not said frames have been received correctly.

5. A retransmission control method for a CDMA mobile communication system in which a user data is unidirectionally transmitted in packets from a sending side to a receiving side between a base station and a plurality of mobile stations, said method comprising the steps of:
    (a) establishing a plurality of forward and backward channels in pairs each assigned for communication between said base station and one of said plurality of mobile stations and each assigned a different spread code, a backward channel of each pair being assigned a spread code of a higher process gain than a spread code assigned to the forward channel of the same pair;
    (b) dividing each of said packets into a plurality of frames at said sending side;
    (c) transmitting said frames from said sending side to said receiving side through said forward channels;
    (d) upon each receipit of one frame, transmitting from said receiving side to said sending side through said backward channels, a backward control signal that indicates whether or not said one frame has been received correctly at said receiving side, said backward control signals being transmitted through said backward channels with lower transmission power than that with which said frames are transmitted through said forward channels; and
    (e) retransmitting, from said sending side to said receiving side through said forward channels, a frame that said backward control signal indicates has not been received correctly at said receiving side.

6. A retransmission control method as recited in claim 5, wherein each frame includes error detecting codes attached thereto at said sending sides and it is determined at the received side based on said error detecting codes whether or not said frames have been received correctly.

7. A retransmission method as recited in claim 5, wherein said spread codes assigned to said backward channels have a process gain that stretches a transmission time of one backward control signal equal to a transmission time of one frame.

8. A retransmission control method for a CDMA mobile communication system in which a user data is unidirectionally transmitted in packets from a sending side to a receiving side between a base station and a plurality of mobile stations, said method comprising the steps of:
    (a) establishing a plurality of forward channels each assigned to one of said plurality of mobile stations and at least one backward channel, said backward channel being assigned a spread code that is different from spread codes assigned to said forward channels;
    (b) dividing at said sending side each of said packets into a plurality of frames each including an error detecting code;
    (c) transmitting said frames from said sending side to said receiving side through said forward channels;
    (d) determining based on said error detecting code whether or not each frame has been correctly received at said receiving side;
    (e) upon each receipt of one frame, generating at said receiving side a backward control signal that indicates whether or not said one frame has been received correctly at said receiving side;
    (f) repeatedly applying said spread code assigned to said backward channel to said backward control signal to stretch the data length of said backward control signal;
    (g) transmitting said stretched backward control signal from said receiving side to said sending side through said at least one backward channel; and
    (h) retransmitting from said sending side to said receiving side through said forward channels a frame that said backward control signal indicates has not been received correctly at said receiving side.

9. A retransmission method as recited in claim 8, wherein said spread code assigned to said backward channel is repeatedly applied to said backward control signal to stretch a transmission time of one backward control signal equal to a transmission time of one frame.

10. A retransmission control method for a CDMA mobile communication system in which a user data is unidirectionally transmitted in packets from a sending side to a receiving side between a base station and a plurality of mobile stations, said method comprising the steps of:
- (a) establishing a plurality of forward channels each assigned to one of said plurality of mobile stations and at least one backward channel, said backward channel being assigned a spread code of a higher process gain than spread codes assigned to said forward channels;
- (b) dividing at said sending side each of said packets into a plurality of frames each including an error detecting code;
- (c) transmitting said frames from said sending side to said receiving side through said forward channels;
- (d) determining based on said error detecting code whether or not each frame has been correctly received at said receiving side;
- (e) upon each receipt of one frame, transmitting from said receiving side to said sending side through said backward channels, a backward control signal that indicates whether or not said one frame has been received correctly at said receiving side; and
- (f) retransmitting, from said sending side to said receiving side through said forward channels, a frame that said backward control signal indicates has not been received correctly at said receiving side.

11. A retransmission method as recited in claim 10, wherein said spread code assigned to said backward channel has a process gain that stretches a transmission time of one backward control signal equal to a transmission time of one frame.

* * * * *

UNITED STATES PATENT AND TRADEMARK OFFICE
CERTIFICATE OF CORRECTION

PATENT NO.    : 6,157,628
DATED         : December 5, 2000
INVENTOR(S)   : Shinji Uebayashi et al.

It is certified that error appears in the above-identified patent and that said Letters Patent is hereby corrected as shown below:

<u>Title page,</u>
Item [75], should read:
-- Inventors: Shinji Uebayashi, Yokahama; Hui Zhao, Yokosuka; both of Kanagawa (JP) --.

Item [73], change "Inc., Japan" to -- Inc., Tokyo, Japan --.

Item [57], ABSTRACT,
Line 8, change "channel,. Base" to -- channel. Base --.

Signed and Sealed this

Thirteenth Day of August, 2002

*Attest:*

*Attesting Officer*

JAMES E. ROGAN
*Director of the United States Patent and Trademark Office*